UNITED STATES PATENT OFFICE.

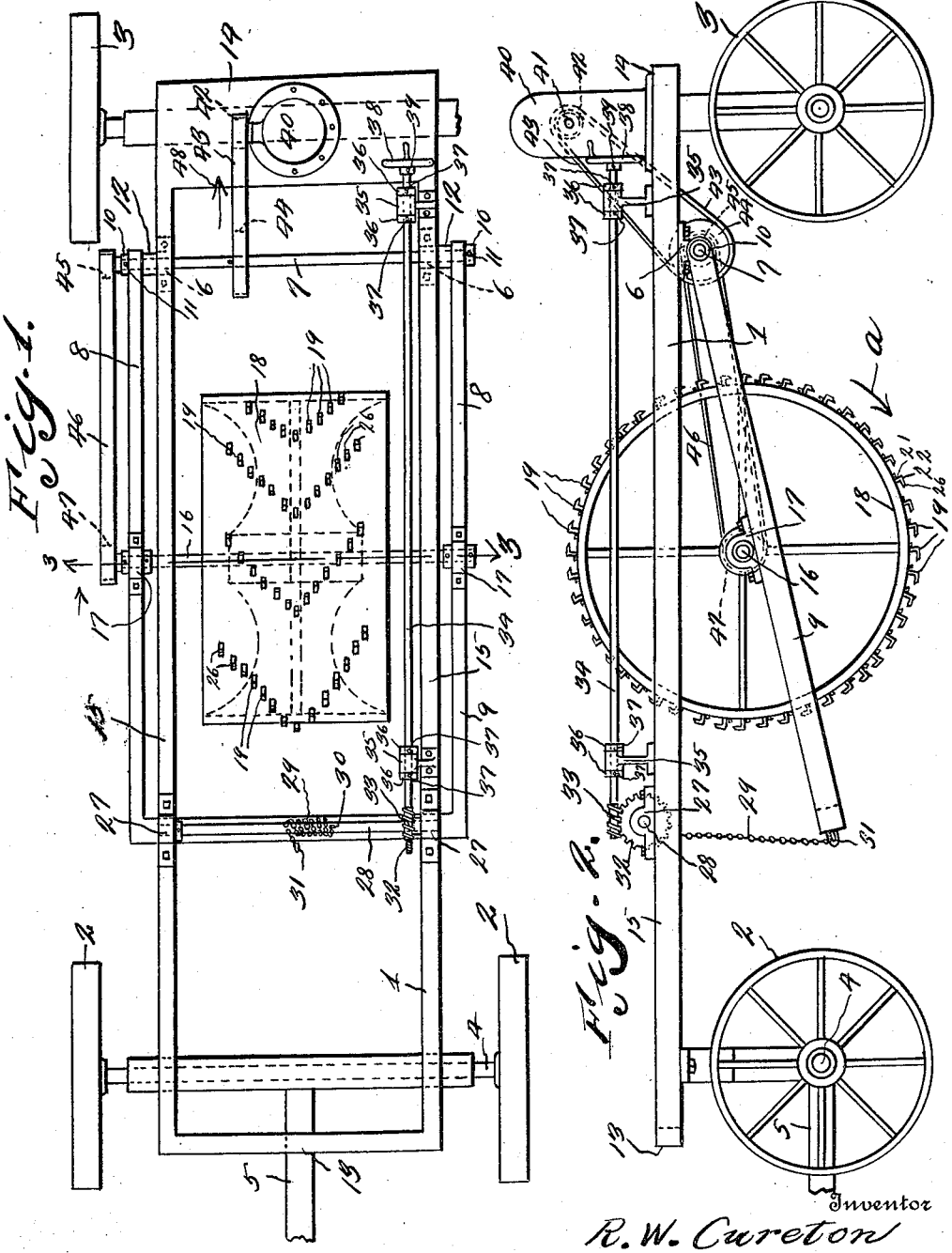

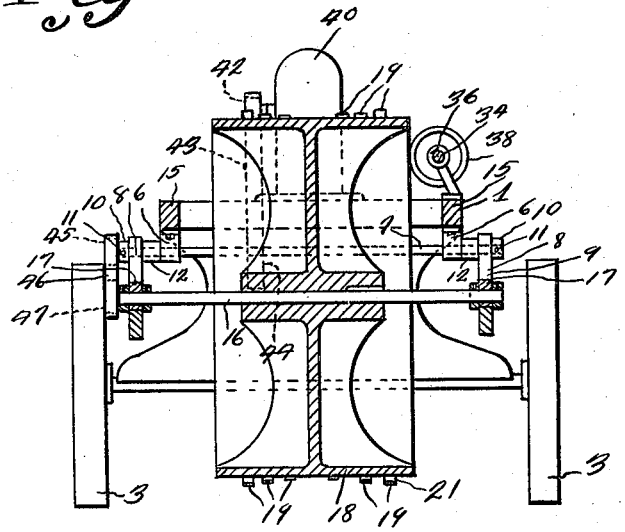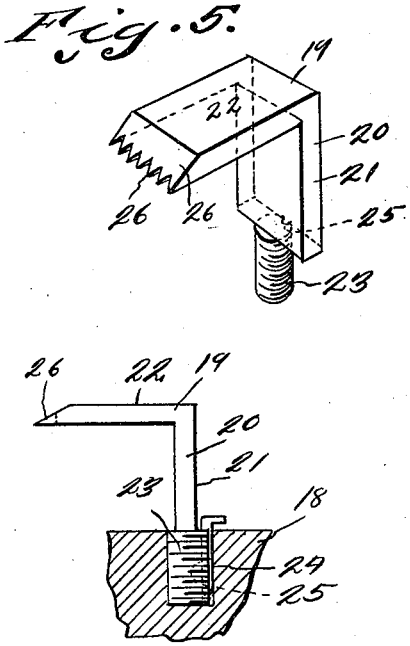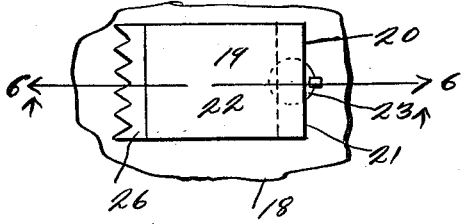

RICHARD WALLACE CURETON, OF LORDSBURG, NEW MEXICO.

GRASS-HARVESTING MACHINE.

1,311,382.     Specification of Letters Patent.     Patented July 29, 1919.

Application filed January 25, 1918. Serial No. 213,672.

*To all whom it may concern:*

Be it known that I, RICHARD WALLACE CURETON, a citizen of the United States, residing at Lordsburg, in the county of Grant, State of New Mexico, have invented a new and useful Grass-Harvesting Machine; and I do hereby declare the following to be a full, clear, and exact description of the invention, such as will enable others skilled in the art to which it appertains to make and use the same.

This invention relates to an improved grass harvesting machine, and an object of the invention is to provide an apparatus of this kind particularly adapted to harvest or uproot grass and the like, particularly what is known as "bear" grass that grows very extensively in certain sections of the country. This grass is somewhat in the form of celery when torn out of the ground and it grows in clusters about five feet high in areas of about two square feet. This kind of grass when harvested will break off below the ground about two inches, leaving the roots intact in the ground, and which roots will again sprout.

One of the objects of the invention is to provide an improved machine of this kind having means for efficiently harvesting the grass, whereby the roots may remain intact in the ground.

A further object of the invention is to provide a machine comprising a main frame and an auxiliary frame pivotally supported thereon, and a revoluble wheel drum mounted in bearings of the pivoted frame, said drum having grass gathering or rooting fingers on its perimeter for gathering or rooting the grass from the soil, so as to leave the roots intact.

A further object of the invention is the provision of means for raising and lowering the pivoted frame, whereby the depth of the grass rooting drum may be regulated.

In practical fields the details of construction may necessitate alterations falling within the scope of what is claimed.

The invention comprises further features and combination of parts as hereinafter set forth, shown in the drawings and claimed.

In the drawings:—

Figure 1 is a plan view of the improved harvesting machine constructed in accordance with the invention.

Fig. 2 is a view in side elevation of the same.

Fig. 3 is a transverse sectional view on line 3—3 of Fig. 1.

Fig. 4 is a plan view of one of the teeth of the grass rooting drum.

Fig. 5 is a detail perspective view of said tooth.

Fig. 6 is a detail view of said tooth showing the means for fastening the same securely to the perimeter of the drum.

Referring more especially to the drawings, 1 designates the main frame, which is mounted upon forward and rear supporting wheels 2 and 3, the axle 4 of the forward wheels has connected thereto a suitable tongue 5, whereby the machine may be drawn by draft animals, or attached to the rear of a wagon or other vehicle, to trail in the rear. Mounted in bearings 6 of the under part of the main frame is a shaft 7, on the ends of which the rear ends of the side rails 8 of the auxiliary frame 9 are pivotally mounted, there being collars 10 secured by pins 11 on said shaft to hold the side rails in place. Suitable collars 12 intervene between the rails 8 and the sides of the main frame 1. The main frame 1 also consists of the forward rail 13, the rear part 14 and the side rails 15. A shaft 16 is mounted in bearings 17 of the side rails 8 of said auxiliary pivoted frame. Mounted upon the shaft 16 is a wheel drum 18, keyed to rotate with the shaft. On the perimeter of the drum are series of grass gathering teeth 19. The teeth of each series are arranged V-shaped, and each tooth 20 comprises the parts 21 and 22 extending at right angles to each other. The part 21 is provided with a cylindrical body 23 which is threaded into the perimeter of the drum, there being a key engaging the key-ways 24 and 25 of the perimeter of the drum and the body 23, to prevent the tooth from turning. It is to be noted that the part 20 extends radially from the perimeter of the drum, while the part 22 extends substantially concentric with the perimeter of the drum and the forward bevel portion of the part 22 has teeth 26. The wheel drum operates in the direction of the arrow *a* when the machine or apparatus is driven forwardly, and since the teeth are arranged V-shaped as shown in Fig. 1, and the teeth of each series in stepped relation, the parts 22 act to gather the bear grass. The teeth 26 being sharp and V-shaped will dig into the blades of the grass and consequently grasp the blades of grass at a point near but above the ground, so that as the drum further revolves, the blades of grass will be broken from the stalks at a point above the ground, thereby leaving a portion of the grass and the roots in the ground, in order to spring or sprout up again. Mounted in bearings 27 of the side rails 15 of the frame 1 is a shaft 28. A chain 29 is wound about the shaft 28 and has one end connected at 30 to said shaft, and its other end to an eye 31 of the lower forward end of the frame 9. Carried by and rotatable with the shaft 28 is a worm wheel 32, which meshes with the worm 33 of the shaft 34. The shaft 34 is mounted in the bearings 35 on the frame 1. Suitable collars 36 are secured by pins 37 on the shaft 34 and in engagement with the bearings 35, so as to prevent axial movement of the shaft 34. A hand wheel 38 is secured by a pin 39 on the rear end of the shaft 34, whereby the shaft 34 may be rotated, and through its worm connection with the shaft 28, the chain 29 may be operated, so as to raise or lower the frame 9, consequently govern the position of the wheel drum, whereby the teeth thereon may root the bear grass as may be desired by the operator. A suitable gas motor of any conventional type 40 is mounted upon the frame 1 at the rear thereof, and the shaft 41 of this motor has a pulley 42, which, by means of the belt 43, is belted to the pulley 44 which is keyed on the shaft 7. One end of the shaft 7 has a pulley 45, and by means of the belt 46 said pulley 45 is belted to the pulley 47 on the shaft 16. The motor 40 is operated so as to drive the belt 43 in the direction of the arrow 48, which will operate the wheel drum in the desired direction, as indicated by the arrow $a$. A team of draft animals (not shown) may be connected to the tongue 5 for drawing the apparatus, or the tongue may be connected to the rear of a wagon or other vehicle as a trailer. However, if desired the front wheels 2 and their axle may be removed and the frame 1 may be pivotally connected to the tail end of a wagon or the like.

The invention having been set forth what is claimed as new and useful is:—

In combination with a wheel drum having a rim, a plurality of series of teeth on the peripheral surface of said rim, the teeth of each series being arranged V-shaped and in stepped relation, each tooth being angular, one arm of the angle extending radially from the rim, and the other arm substantially concentric with the rim, said other arm having its end beveled and provided with a serrated edge forming gripping teeth, the radial arm having a threaded connection in said rim, and means to prevent the radial arm from unscrewing.

In testimony whereof I have signed my name to this specification in the presence of two subscribing witnesses.

RICHARD WALLACE CURETON.

Witnesses:
J. E. PAULUS,
E. L. JONES.